United States Patent
Hu

(10) Patent No.: US 12,176,978 B2
(45) Date of Patent: Dec. 24, 2024

(54) COMMUNICATION METHOD AND APPARATUS, AND READABLE STORAGE MEDIUM

(71) Applicant: GUANGDONG OPPO MOBILE TELECOMMUNICATIONS CORP., LTD., Dongguan (CN)

(72) Inventor: Rongyi Hu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 71 days.

(21) Appl. No.: 18/089,294

(22) Filed: Dec. 27, 2022

(65) Prior Publication Data
US 2023/0239017 A1 Jul. 27, 2023

Related U.S. Application Data

(63) Continuation of application No. PCT/CN2020/099049, filed on Jun. 29, 2020.

(51) Int. Cl.
*H04B 7/06* (2006.01)
*H04W 36/08* (2009.01)
*H04W 48/16* (2009.01)

(52) U.S. Cl.
CPC ........ *H04B 7/0608* (2013.01); *H04W 36/085* (2023.05); *H04W 48/16* (2013.01)

(58) Field of Classification Search
CPC .. H04B 7/0608; H04B 7/0404; H04B 7/0602; H04B 7/0628; H04B 7/0691;
(Continued)

(56) References Cited

U.S. PATENT DOCUMENTS

2019/0174466 A1    6/2019   Zhang et al.
2019/0245649 A1*   8/2019   Siomina .............. H04L 1/0026
(Continued)

FOREIGN PATENT DOCUMENTS

CN    110519853 A    11/2019
CN    111052838 A     4/2020
(Continued)

OTHER PUBLICATIONS

Guangdong Oppo Mobile Telecommunications Corp., Ltd., PCT/CN2020/099049, International Search Report and Written Opinion, Mar. 25, 2021, 12 pgs.
(Continued)

*Primary Examiner* — Emmanuel Bayard
(74) *Attorney, Agent, or Firm* — Morgan, Lewis & Bockius LLP

(57) ABSTRACT

A communication method includes: receiving, by a network device, first information sent by a terminal device: where the first information includes capability information of the terminal device and uplink sounding reference signal (SRS) antenna switch requirement information of the terminal device, the capability information of the terminal device is used for indicating antenna switch capability supported by the terminal device, and the SRS antenna switch requirement information is used for indicating requirement for terminal device to perform SRS antenna switch.

16 Claims, 5 Drawing Sheets

(58) Field of Classification Search
CPC ..... H04W 36/085; H04W 48/16; H04W 8/24; H04L 5/0057; H04L 5/0048
USPC .................................................. 375/262, 267
See application file for complete search history.

(56) References Cited

U.S. PATENT DOCUMENTS

| | | | |
|---|---|---|---|
| 2019/0253214 A1* | 8/2019 | Liu | H04B 7/0456 |
| 2020/0037383 A1 | 1/2020 | Rico Alvarino et al. | |
| 2020/0382252 A1* | 12/2020 | Sun | H04B 7/0626 |
| 2021/0159962 A1 | 5/2021 | Zhang | |
| 2021/0367724 A1* | 11/2021 | Zhang | H04L 5/0048 |
| 2022/0060307 A1* | 2/2022 | Manolakos | H04L 5/001 |
| 2022/0166587 A1* | 5/2022 | Go | H04L 5/0048 |
| 2022/0201696 A1* | 6/2022 | Go | H04W 72/0446 |
| 2023/0084239 A1* | 3/2023 | Cha | H04W 52/241 455/522 |
| 2023/0239845 A1* | 7/2023 | Rico Alvarino | H04W 72/0446 370/336 |

FOREIGN PATENT DOCUMENTS

| | | |
|---|---|---|
| WO | WO2019160775 A1 | 8/2019 |
| WO | WO2020034536 A1 | 2/2020 |
| WO | WO2020227106 A1 | 11/2020 |
| WO | WO2021159452 A1 | 8/2021 |
| WO | WO2022000214 A1 | 1/2022 |

OTHER PUBLICATIONS

MediaTek Inc., "Interruption at SRS antenna switching" 3GPP TSG-RAN WG4 Meeting #90, R4-1900682, Athens, Greece, Feb. 25-Mar. 1, 2019, 5 pgs.
Huawei, HiSilicon, "SRS antenna switching". R1-1715596, Nagoya, Japan, Sep. 18-21, 2017. 6 pgs.
3GPP TS 38.133 V16.0.0 (Jun. 2019); Technical Specification Group Radio Access Network; NR; Requirements for support of radio resource management (Release 16), 992 pgs.
3GPP TS 38.214 V16.0.0 (Dec. 2019); Technical Specification Group Radio Access Network; NR; Physical layer procedures for data (Release 16), 147 pgs.
3GPP TS 38.306 V16.0.0 (Mar. 2020); Technical Specification Group Radio Access Network; NR; User Equipment (UE) radio access capabilities (Release 16). 55 pgs.
3GPP TS 38.331 V16.0.0 (Mar. 2020); Technical Specification Group Radio Access Network; NR; Radio Resource Control (RRC) protocol specification (Release 16), 832 pgs.
Guangdong Oppo Mobile Telecommunications Corp., Ltd., EP20943086.7, Extended European Search Report, Jun. 29, 2023, 11 pgs.

* cited by examiner

COMMUNICATION METHOD AND APPARATUS, AND READABLE STORAGE MEDIUM

CROSS-REFERENCE TO RELATED APPLICATIONS

This application is a continuation of PCT application No. PCT/CN2020/099049, filed Jun. 29, 2020, entitled "COMMUNICATION METHOD AND APPARATUS, AND READABLE STORAGE MEDIUM," which is hereby incorporated by reference in its entirety.

TECHNICAL FIELD

This application relates to the field of communication technologies, and in particular, to a communication method, a device, and a readable storage medium.

BACKGROUND

In a mobile communication system, network devices usually need to obtain downlink channel state information (CSI), and perform downlink scheduling according to the downlink CSI. Specifically, terminal devices may send uplink sounding reference signal (SRS) to the network device through the antenna port, and a base station may obtain downlink CSI according to the received SRS. With the continuous development of communication technology, terminal devices can support SRS antenna round (-transmission), that is, sending SRS on multiple physical antennas of the terminal device in turn, so that the network device can obtain more accurate downlink CSI.

However, when the terminal device performs antenna switch for the SRS, how the network device accurately obtains a relevant configuration of the SRS antenna switch of the terminal device is an urgent problem to be solved at present.

SUMMARY

Embodiments of this application provide a communication method, a device, and a readable storage medium, so that a network device can accurately obtain a configuration related to SRS antenna switch of a terminal device.

In a first aspect, embodiments of this application provide a communication method, including:
  receiving, by a network device, first information sent by a terminal device, where the first information includes capability information of the terminal device and uplink sounding reference signal (SRS) antenna switch requirement information of the terminal device;
  where the capability information of the terminal device is used for indicating antenna switch capability supported by the terminal device; and the SRS antenna switch requirement information is used for indicating requirement for the terminal device to perform SRS antenna switch.

In a second aspect, embodiments of this application also provide a communication method, including:
  sending, by a terminal device, first information to a network device, where the first information includes capability information of the terminal device and uplink SRS antenna switch requirement information of the terminal device;
  where the capability information of the terminal device is used for indicating antenna switch capability supported by the terminal device; and the SRS antenna switch requirement information is used for indicating requirement for the terminal device to perform SRS antenna switch.

In a third aspect, embodiments of this application provide a communication device, including:
  a transceiving module, configured to receive first information sent by a terminal device, where the first information includes capability information of the terminal device and uplink SRS antenna switch requirement information of the terminal device;
  where the capability information of the terminal device is used for indicating antenna switch capability supported by the terminal device; and the SRS antenna switch requirement information is used for indicating requirement for the terminal device to perform SRS antenna switch.

In a fourth aspect, embodiments of this application provide a communication device, including:
  a transceiving module, configured to send first information to a network device, where the first information includes capability information of the terminal device and uplink SRS antenna switch requirement information of the terminal device;
  where the capability information of the terminal device is used for indicating antenna switch capability supported by the terminal device; and the SRS antenna switch requirement information is used for indicating requirement for the terminal device to perform SRS antenna switch.

In a fifth aspect, embodiments of this application provide a communication device, including:
  a processor, a memory, and an interface for communication with a terminal device; where the memory stores computer-executable instructions; and the processor executes the computer-executable instructions stored in the memory, causing the processor to perform the communication method according to any embodiment of the first aspect.

In a sixth aspect, embodiments of this application provide a communication device, including:
  a processor, a memory, and an interface for communication with a network device; where the memory stores computer-executable instructions; and the processor executes the computer-executable instructions stored in the memory, causing the processor to perform the communication method according to any embodiment of the second aspect.

In a seventh aspect, embodiments of this application provide a computer-readable storage medium, storing therein computer-executable instructions, where the computer-executable instructions, when being executed by a processor, are used for implementing the communication method according to any embodiment of the first aspect.

In an eighth aspect, embodiments of this application provide a computer-readable storage medium, storing therein computer-executable instructions, where the computer-executable instructions, when being executed by a processor, are used for implementing the communication method according to any embodiment of the second aspect.

In a ninth aspect, embodiments of this application provide a program, where the program, when being executed by a processor, is used for performing the communication method according to any embodiment of the first aspect.

In a tenth aspect, embodiments of this application provide a program, where the program, when being executed by a processor, is used for performing the communication method according to any embodiment of the second aspect.

In an eleventh aspect, embodiments of this application provide a computer program product, including program instructions, where the program instructions are used for implementing the communication method according to any embodiment of the first aspect.

In a twelfth aspect, embodiments of this application provide a computer program product, including program instructions, where the program instructions are used for implementing the communication method according to any embodiment of the second aspect.

In a thirteenth aspect, embodiments of this application provide a chip, including: a processing module and a communication interface, where the processing module is configured to perform the communication method according to any embodiment of the first aspect.

Further, the chip also includes a storage module (e.g., a memory), where the storage module is used for storing instructions, the processing module is used for executing the instructions stored in the storage module, and the execution of the instructions stored in the storage module causes the processing module to perform the communication method according to any embodiment of the first aspect.

In a fourteenth aspect, embodiments of this application provide a chip, including: a processing module and a communication interface, where the processing module is configured to perform the communication method according to any embodiment of the second aspect.

Further, the chip also includes a storage module (e.g., a memory), where the storage module is used for storing instructions, the processing module is used for executing the instructions stored in the storage module, and the execution of the instructions stored in the storage module causes the processing module to perform the communication method according to any embodiment of the second aspect.

In a fifteenth aspect, embodiments of this application further provide a communication system, including: a network device and at least one terminal device, where the network device is configured to perform the communication method according to any embodiment of the first aspect as described above, and the terminal device is configured to perform the communication method according to any embodiment of the second aspect as described above.

Embodiments of this application provide a communication method, a device, and a readable storage medium, where the method includes: receiving, by the network device, first information sent by the terminal device, where the first information includes capability information indicating SRS antenna switch capability supported by the terminal device and SRS antenna switch requirement information indicating requirement for the terminal device to perform SRS antenna switch. In this way, the network device can accurately obtain the requirement for the terminal device to perform SRS antenna switch based on the information reported by the terminal device, thereby providing a basis for minimizing the impact of communication link adaptation.

DETAILED DESCRIPTION

In this application, "at least one" means one or more, and "plurality of/multiple" means two or more. The term "and/or", which describes the relationship of the associated objects, indicates that there may be three kinds of relationships. For example, when referring to A and/or B, it may indicate that A exists alone, both A and B exist, and B exists alone, where A and B may be singular or plural. The character "/" generally indicates that the associated objects are in an "or" relationship. The term "at least one of following (items)" or similar expressions thereof may refer to any combination of these items, including any single item or any combination of plural items. For example, at least one (item) of a, b, or c may represent: a, b, c, a-b, a-c, b-c, or a-b-c, where a, b, and c may be singular or plural.

RAN1 introduced the SRS antenna switch mechanism in Rel-15, which is mainly used to define the method for obtaining downlink channel state information for the terminal device with different transmit (Tx) and receive (Rx) antenna combinations/designs. Herein, 7 switch modes are defined in Rel-15, namely, 1T2R, 2T4R, 1T4R, 1T4R/2T4R, 1T=1R, 2T=2R, 4T=4R, where "1T4R/2T4R" means that both 1T4R and 2T4R are supported and a fallback from 2T4R to 1T4R is supported. 6 SRS antenna switch modes are added in Rel-16 based on Rel-15, where the new switch modes include 1T=1R/1T2R, 1T=1R/1T2R/1T4R, 1T=1R/1T2R/2T=2R/2T4R, 1T=1R/1T2R/2T=2R/1T4R/2T4R, 1T=1R/2T2R, and 4T=4R.

Figure 1:
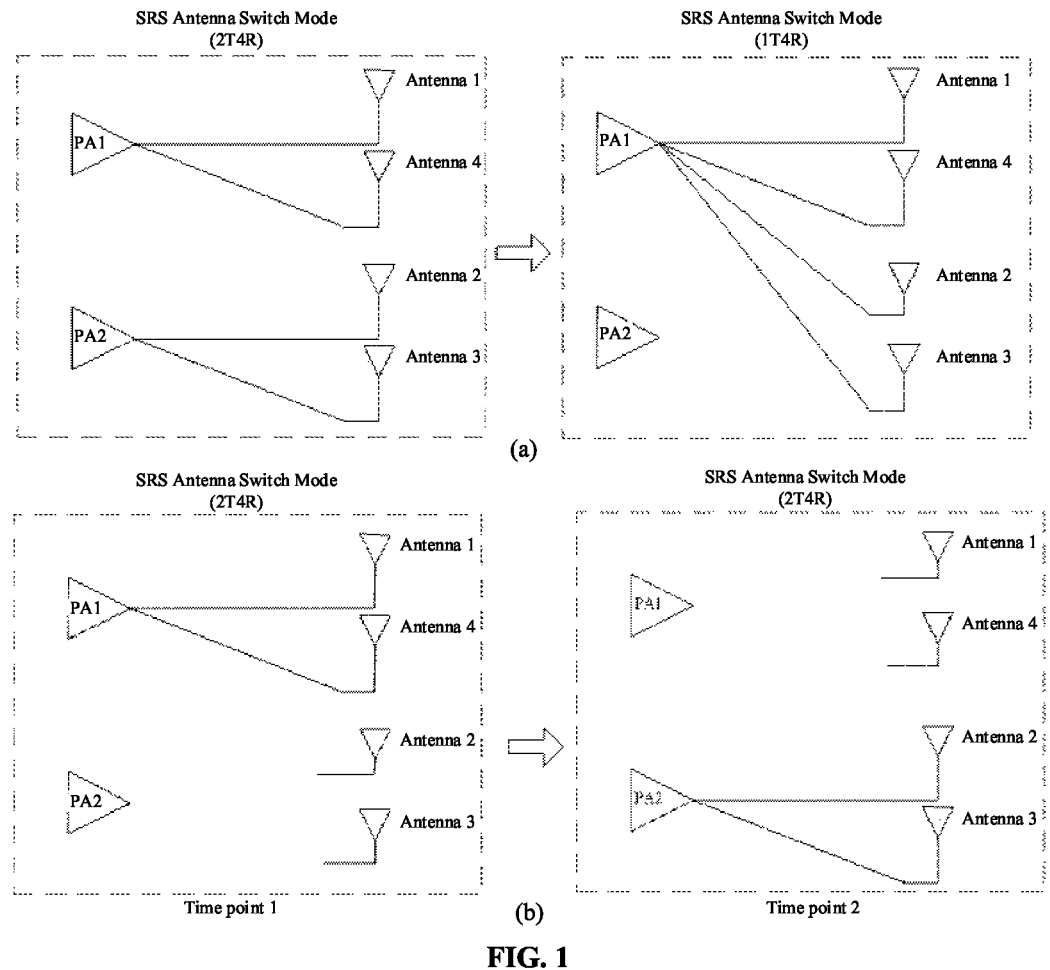
FIG. 1 is a schematic diagram of SRS antenna switch according to some embodiments of this application.

FIG. 1 exemplarily shows a scenario in which a terminal device performs SRS antenna switch. In the situation shown in FIG. 1, the SRS antenna switch mode supported by the terminal device is 1T4R/2T4R. In the situation shown in (a) of FIG. 1, when the terminal device is in the 2T4R mode, an amplifier circuit 1 (PA1) in a radio frequency circuit of the terminal device is connected to antenna 1 and antenna 4, and an amplifier circuit 2 (PA2) in the radio frequency circuit of the terminal device is connected to antenna 2 and antenna 3; when the terminal device falls back from 2T4R to 1T4R, PA1 of the terminal device is connected to the antennas 1 to 4, and PA2 of the terminal device is disconnected from antennas 1 to 4. In the situation shown in (b) of FIG. 1, when the terminal device is in the 2T4R mode, the terminal device performs SRS antenna switch. As shown in (b) of FIG. 1, at time point 1, the terminal device sends SRS by using antenna 1 and antenna 4; and at time point 2, the terminal device sends SRS by using antenna 2 and antenna 3.

The base station can obtain CSI according to the SRS sent by the terminal device, and can also perform downlink scheduling according to the obtained downlink CSI. The base station may obtain the downlink CSI according to the SRS sent by the terminal device in the following manner. If the terminal device adopts the SRS antenna round (-transmission), the base station may obtain the downlink CSI by performing matrix combination of multiple spatial channel matrices received respectively at multiple time points. Since the SRS antenna round can enable the base station to obtain more accurate downlink CSI, which is beneficial to improve the efficiency of the communication system, the SRS antenna switch mechanism has become a popular research direction.

Corresponding capabilities of the terminal device are defined in RAN2, specifically including a capability of the terminal device about whether to support SRS antenna switch on supported combination of frequency bands.

In addition, the terminal device may also send to the network side information indicating whether the SRS antenna switch will affect the reception of the terminal device in other frequency bands (e.g., tx Switch Impact To Rx), and information indicating whether the SRS antenna switch will affect the transmission of the terminal device on other frequency bands (e.g., tx Switch With Another Band).

For the RRM performance of the terminal device, the SRS antenna switch of the terminal device may bring the following problems:

1, supporting SRS antenna switch may cause additional loss of downlink reception power or throughput in some frequency bands;
2, since the switch of physical resources, such as the adjustment of physical antenna, radio frequency or baseband, takes a certain time, SRS antenna switch may result in additional delay required by the current working link of the terminal device or the transmission corresponding to the serving cell, that is, SRS antenna switch may cause switch delay; and
3, SRS antenna switch may cause interruption of transmission or reception on other frequency bands.

However, in the terminal radio resource management (RRM) for SRS antenna switch, these indicators are not clearly defined, which results in that the network device cannot accurately obtain the SRS antenna switch requirements of the terminal device. Furthermore, the downlink scheduling of the base station is prone to unreasonable phenomena, which reduces the efficiency of the communication system.

In view of above, embodiments of this application provide a communication method, the core idea of which lies in, the terminal device reports the capability information of the terminal device and the SRS antenna switch requirement information indicating requirement for the terminal device to perform SRS antenna switch, so the network device can accurately obtain the requirement for the terminal device to perform SRS antenna switch based on the information reported by the terminal device, thereby providing a basis for minimizing the impact of communication link adaptation.

The implementation environment involved in the embodiments of this application is briefly introduced below.

The technical solutions of the embodiments of this application can be applied to various communication systems, including: GSM (Global System of Mobile communication) system, CDMA (Code Division Multiple Access) system, WCDMA (Wideband Code Division Multiple Access) system, GPRS (General Packet Radio Service), LTE (Long Term Evolution) system, LTE FDD (Frequency Division Duplex) system, LTE TDD (Time Division Duplex) system, LTE-A (Advanced long term evolution) system, NR (New Radio) system, NR system evolution system, LTE-U (LTE-Based Access To Unlicensed Spectrum) system, NR-U (NR-Based Access To Unlicensed Spectrum) system, UMTS (Universal Mobile Telecommunication System), WiMAX (Worldwide Interoperability for Microwave Access) communication systems, WLAN (Wireless Local Area Networks), WiFi (Wireless Fidelity), next-generation communication systems or other communication systems, and so on.

Generally speaking, traditional communication systems support a limited number of connections and are easy for implementation. However, with the development of communication technology, mobile communication systems will not only support traditional communication, but also support, for example, D2D (Device to Device) communication, M2M (Machine to Machine) communication, MTC (Machine Type Communication), V2V (Vehicle to Vehicle) communication and V2X (Vehicle to Everything) system, and the like. The embodiments of this application may also be applied to these communication systems.

The system architecture and service scenarios described in the embodiments of this application are for the purpose of illustrating the technical solutions thereof more clearly, and do not constitute limitations on the technical solutions according to the embodiments of this application. With the evolution of the architecture and the emergence of new business scenarios, the technical solutions according to the embodiments of this application are also applicable to similar technical problems therein.

Figure 2:
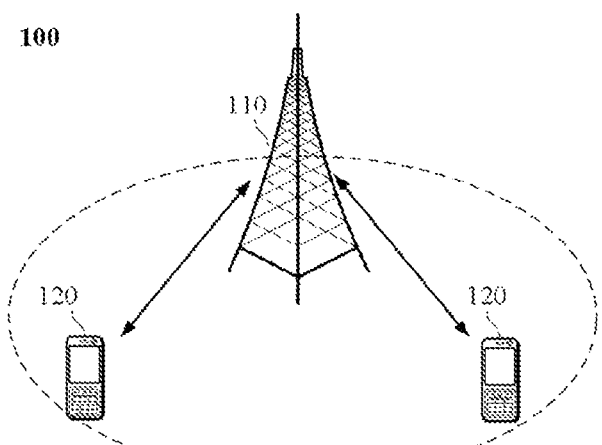
FIG. 2 is a schematic diagram of a communication system to which some embodiments of the application are applied.

Exemplarily, a communication system 100 to which embodiments of this application can be applied is shown in FIG. 2. The communication system 100 may include a network device 110, and the network device 110 may be a device that communicates with a terminal device 120 (or referred to as a communication terminal, a terminal). The network device 110 may provide communication coverage for a particular geographic area and may communicate with terminals located within the coverage area. Optionally, the network device 110 may be an evolutional Node B (eNB or eNodeB) in the LTE system, or a wireless controller in the cloud radio access network (CRAN). Alternatively, the network device may be a mobile switch center, a relay station, an access point, a vehicle-mounted device, a wearable device, a hub, a switch, a bridge, a router, a network-side device in the 5G network, a network device in a future communication system, or the like.

The communication system 100 further includes at least one terminal device 120 located within the coverage of the network device 110. As used herein, "terminal" includes but is not limited to be in connection via wired line, for example, PSTN (Public Switched Telephone Networks), DSL (Digital Subscriber Line), digital cable, and direct cable connection; and/or via another data connection/network; and/or via a wireless interface, for example, cellular network, WLAN (Wireless Local Area Network), digital television network (e.g., DVB-H network), satellite network, AM-FM broadcast transmitter; and/or via a device of another terminal that is configured to receive/transmit a communication signal; and/or via an IoT (Internet of Things) device. A terminal configured to communicate through a wireless interface may be referred to as a "wireless communication terminal", "wireless terminal" or "mobile terminal". Examples of mobile terminals include, but are not limited to, satellite or cellular telephones, PCS (Personal Communications System) terminals that can combine cellular radio telephones with data processing, facsimile, and data communication capabilities, PDA that may include radio telephones, pagers, Internet/Intranet access, Web browsers, memo pads, calendars, and/or GPS (Global Positioning System) receivers, and conventional laptop and/or palmtop receivers or other electronic devices including radio telephone transceivers. The terminal device may refer to access terminal, UE (User Equipment), subscriber unit, subscriber station, mobile station, mobile site, remote station, remote terminal, mobile equipment, user terminal, terminal, wireless communication equipment, user agent or user device. The access terminal may be a cellular phone, a cordless phone, a SIP (Session Initiation Protocol) phone, a WLL (Wireless Local Loop) station, a PDA (Personal Digital Assistant), a handheld device or a computing device with wireless communication function, other processing devices, in-vehicle devices, wearable devices connected to a wireless modem, terminals in 5G networks, terminals in future evolved PLMNs, or the like.

Optionally, D2D communication may be performed between terminal devices 120.

Optionally, the 5G communication system or the 5G network may also be referred to as an NR system or an NR network.

FIG. 2 exemplarily shows one network device and two terminals. Optionally, the communication system 100 may include multiple network devices, and the coverage of each network device may include other numbers of terminals. Embodiments of this application are not limited thereto. Optionally, the communication system 100 may further include other network entities such as a network controller and a mobility management entity, which are not limited in the embodiments of this application.

It should be understood that, in embodiments of this application, a device having a communication function in the network/system may be referred to as a communication device. Taking the communication system 100 shown in FIG. 3 as an example, the communication device may include the network device 110 and the terminal device 120 with the communication function, and the network device 110 and the terminal device 120 may be the specific devices described above, which will not be repeated here. The communication device may also include other devices in the communication system 100, such as other network entities such as a network controller, a mobility management entity, the like, which are not limited in the embodiments of this application.

The following describes in detail how the network device accurately obtains the SRS antenna switch requirement of the terminal device through several exemplary embodiments.

Figure 3A:
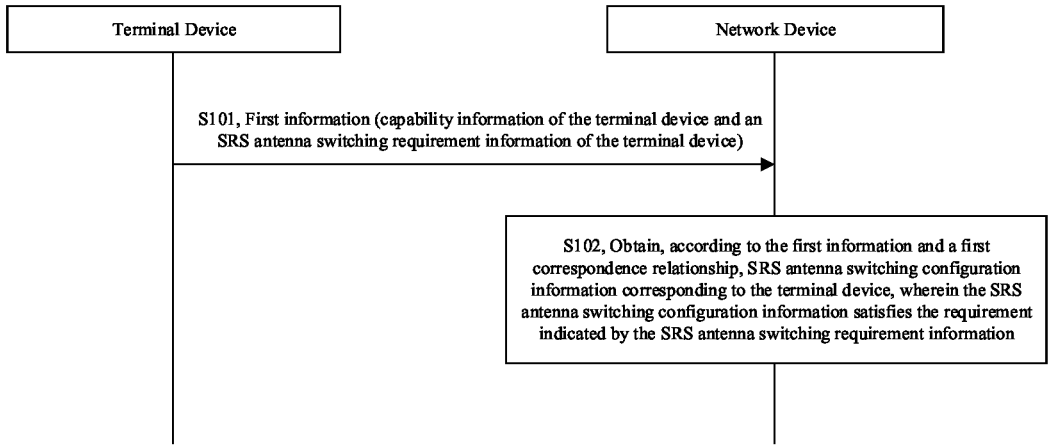
FIG. 3A is a flowchart of a communication method according to some embodiments of this application.

FIG. 3A is a flowchart of a communication method according to some embodiments of this application. As shown in FIG. 3A, the method according to some embodiments includes a following step.

In S101, the terminal device sends first information to the network device, where the first information includes capability information of the terminal device and SRS antenna switch requirement information of the terminal device.

Correspondingly, the network device receives the first information sent by the terminal device.

Optionally, the capability information of the terminal device (UE capabilities) included in the first information is used for indicating the antenna switch capability supported by the terminal device. For example, the capability information of the terminal device may include: a capability of whether the terminal device supports SRS antenna switch on combination of frequency bands, and SRS antenna switch modes supported by terminal device.

Optionally, the capability information of the terminal device may include: information indicating whether the SRS antenna switch will affect the reception of the terminal device in other frequency bands (e.g., tx Switch Impact To Rx), and information indicating whether the SRS antenna switch will affect the transmission of the terminal device on other frequency bands (e.g., tx Switch With Another Band).

Optionally, the capability information of the terminal device may further include: information used for indicating a switch delay (delay) supported by the terminal device. Exemplarily, the information of the switch delay supported by the terminal device may be the information of the switch delay type supported by the terminal device.

The SRS antenna switch requirement information (SRS antenna port switch requirement information) corresponding to the terminal device includes at least one of the following information: an insertion loss fallback value of a target frequency band corresponding to the SRS antenna switch performed by the terminal device, switch delay requirement and interruption requirement corresponding to the SRS antenna switch performed by the terminal device.

The insertion loss fallback value is the insertion loss fallback value of the target frequency band corresponding to the SRS antenna switch performed by the terminal device. Specifically, the insertion loss backoff value is used for indicating additional losses of reception power and throughput on the target frequency band corresponding to the SRS antenna switch performed by the terminal device.

The switch delay requirement is the switch delay requirement corresponding to the SRS antenna switch performed by the terminal device. Specifically, the switch delay requirement may include whether the terminal device supports switch delay, and/or requirements of corresponding switch delay types when the terminal device supports different switches, where each switch delay type corresponds to one or more switch delays.

The interruption requirement is the interruption requirement corresponding to the SRS antenna switch performed by the terminal device. Specifically, the interruption requirement may include whether the terminal device supports interruption of SRS antenna switch, and/or a requirement for a corresponding interruption time when the terminal device supports interruption of SRS antenna switch.

It should be noted that in some embodiments, the SRS antenna switch requirement information is used to reflect the implementation requirements of the terminal device for performing SRS antenna switch, and the SRS antenna switch requirement information may also be referred to as other names, for example, first requirement information, first SRS antenna switch requirement, SRS antenna switch implementation requirement, and the like, which are not limited in the embodiments of this application. In addition, for the terminal device, the SRS antenna switch requirement information may be configured by the network side, or may be determined by the terminal device itself.

In some embodiments, the capability information of the terminal device and the SRS antenna switch requirement information of the terminal device may be sent separately, or the capability information of the terminal device and the SRS antenna switch requirement information of the terminal device may be sent at the same time, or the SRS antenna switch requirement information of the terminal device may be indicated by the capability information of the terminal device, which is not limited in the embodiments of this application.

It should be understood that the first information may be sent by the terminal device through multiple signalings, or may be sent by the terminal device through a single signaling, which is not limited in the embodiments of this application.

In some embodiments, the terminal device reports the capability information of the terminal device and the SRS antenna switch requirement information indicating requirement for the terminal device to perform SRS antenna switch, so the network device can accurately obtain the requirement for the terminal device to perform SRS antenna switch, thereby providing a basis for minimizing the impact of communication link adaptation.

Optionally, on the basis of the embodiments shown in FIG. 3A, a following step may be further included.

In S102, the network device acquires SRS antenna switch configuration information corresponding to the terminal device according to the first information and a first correspondence, where the SRS antenna switch configuration information meets the requirement indicated by the SRS antenna switch requirement information.

The purpose of this step is to obtain the SRS antenna switch configuration information, and the SRS antenna switch configuration information meets the requirement indicated by the SRS antenna switch requirement information.

It should be noted that the first correspondence may be preset, or may be defined in a protocol, or may also be configured by the network side, which is not limited in the embodiments of this application.

Optionally, the first correspondence may include multiple correspondences, and the multiple correspondences are all used to obtain the SRS antenna switch configuration information. For example, different correspondences may be used to obtain one or more parameters included in different SRS antenna switch configuration information, or used to obtain one or more configuration information, which is not limited in the embodiments of this application.

In some embodiments, the network device accurately acquires SRS antenna switch configuration information that meets the SRS antenna switch requirement based on the first information reported by the terminal device and the first correspondence. In this way, the network device can obtain accurate SRS antenna switch configuration information, thereby providing a basis for minimizing the impact of communication link adaptation.

Figure 3B:
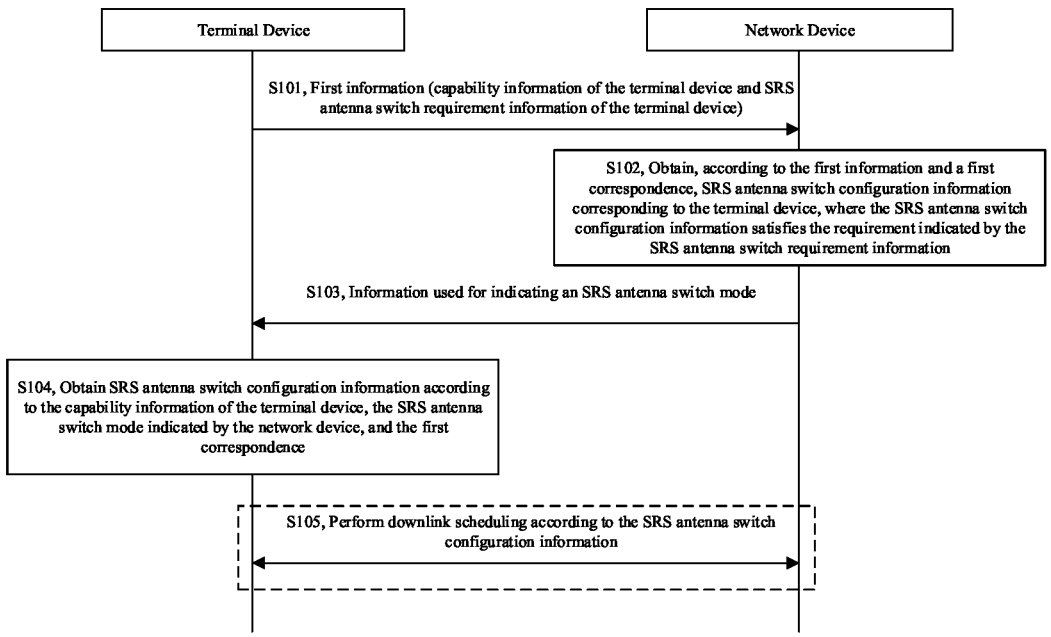
FIG. 3B is a flowchart of a communication method according to some other embodiments of this application.

FIG. 3B is a flowchart of a communication method according to some other embodiments of this application. Based on the embodiments shown in FIG. 3A, the method in some embodiments may further include a following step after S101.

In S103, the network device sends information indicating an SRS antenna switch mode to the terminal device.

In some cases, the network device may need to send information for indicating the SRS antenna switch mode to the terminal device, so as to indicate the terminal device to perform SRS antenna switch according to the SRS antenna switch mode sent by the network device.

For example, the network device determines that the terminal device is configured with multiple SRS antenna switch modes according to the SRS antenna switch request information of the terminal device, then the network device configures the SRS antenna switch mode for the terminal device from the multiple SRS antenna switch modes, and sends to the terminal device the information indicating the configured SRS antenna switch mode.

For another example, the network device determines, according to the first information, that the terminal device is configured with multiple SRS antenna switch modes, the network device may indicate the terminal device to switch between the configured multiple SRS antenna switch modes in an indicated manner. For example, the SRS antenna switch modes acquired by the network device includes switch mode 1 and switch mode 2, then the network device may indicate the terminal device to perform SRS antenna switch according to switch mode 1 in time period 1, and perform SRS antenna switch according to switch mode 2 in time period 2.

Optionally, the terminal device may determine the SRS antenna switch mode of the terminal device according to the SRS antenna switch requirement information. Exemplarily, the terminal device determines the SRS antenna switch mode of the terminal device according to the capability information of the terminal device and the SRS antenna switch requirement information of the terminal device included in the first information. In some embodiments, the determined SRS antenna switch mode of the terminal device may include one SRS antenna switch mode, and may also include multiple SRS antenna switch modes, which are not limited in the embodiments of this application.

In some embodiments, the network device sends information for indicating the SRS antenna switch mode to the terminal device, and the terminal device can obtain the SRS antenna switch configuration information of the terminal device according to the SRS antenna switch mode indicated by the network device and the capability information of the terminal device, and perform the SRS antenna switch according to the determined SRS antenna switch configuration, thereby improving the flexibility of RRM of the terminal device for the SRS antenna switch, and facilitating to improve the efficiency of the communication system.

Optionally, on the basis of the embodiments shown in FIG. 3B, a following step may be further included after S103.

In S104, the terminal device acquires SRS antenna switch configuration information according to the capability information of the terminal device, the SRS antenna switch mode indicated by the network device, and the first correspondence.

Specifically, the terminal device may obtain the SRS antenna switch configuration information that meets the requirement indicated by the SRS antenna switch requirement information according to the capability information of the terminal device, the SRS antenna switch mode indicated by the network device, and the first correspondence.

In some embodiments, the network device indicates the SRS antenna switch mode to the terminal device, and the terminal device obtains the SRS antenna switch configuration information that meets the requirement indicated by the SRS antenna switch requirement information according to the SRS antenna switch mode indicated by the network device. In this way, the network device and the terminal device can obtain the SRS antenna switch configuration information, the signaling overhead of transmitting the SRS antenna switch configuration is reduced, and the efficiency of the communication system is improved.

Optionally, on the basis of the embodiments shown in FIG. 3B, a following step may be further included after S104.

In S105, the network device performs downlink scheduling according to the SRS antenna switch configuration information.

In some embodiments, the network device can reasonably schedule the terminal device according to the SRS antenna switch configuration information corresponding to the terminal device to avoid conflict of transmission resources, thereby improving the transmission performance of the terminal device and improving the efficiency of the communication system.

Figure 3C:
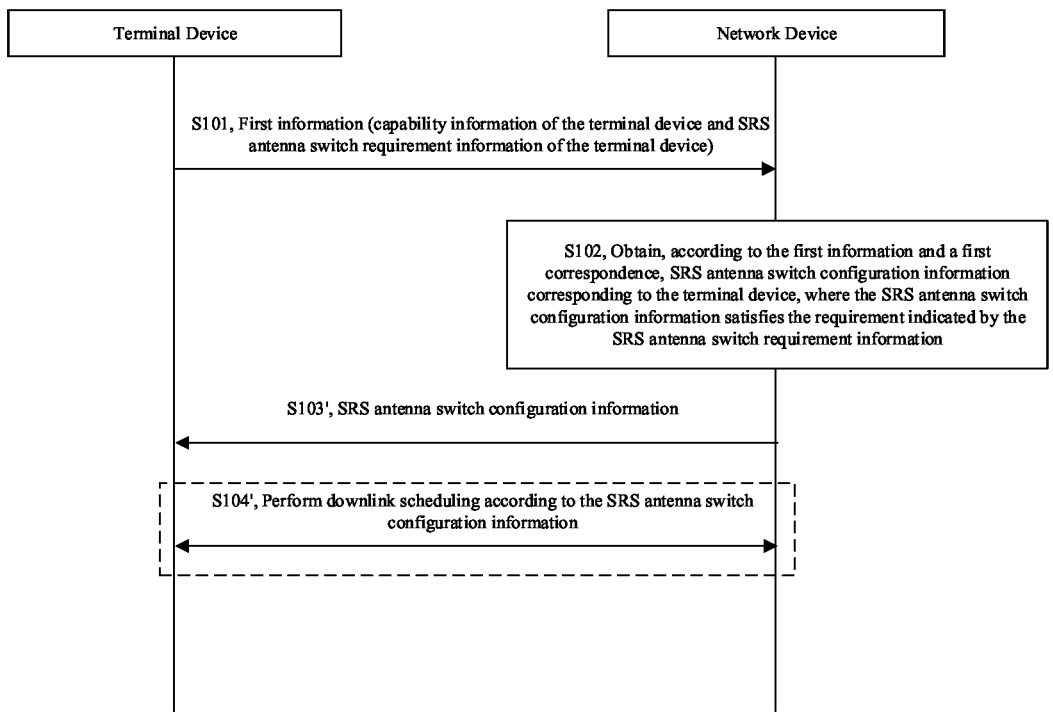
FIG. 3C is a flowchart of a communication method according to some other embodiments of this application.

FIG. 3C is a flowchart of a communication method according to some other embodiments of this application. The method shown in some embodiments, on the basis of the embodiments shown in FIG. 3A, may further include a following step after S102.

In S103', the network device sends the SRS antenna switch configuration information to the terminal device. Correspondingly, the terminal device receives the SRS antenna switch configuration information sent by the network device.

In some embodiments, the network device can configure the SRS antenna switch configuration information of the terminal device. Therefore, after acquiring the SRS antenna switch configuration information, the network device may also send the SRS antenna switch configuration information to the terminal device.

It should be noted that if the network device sends the SRS antenna switch configuration information and the information indicating the SRS antenna switch mode to the terminal device, the SRS antenna switch configuration information and the information indicating the SRS antenna switch mode may be sent through the same signaling or through different signalings, which is not limited in the embodiments of this application.

In some embodiments, the network device indicates the SRS antenna switch configuration information to the terminal device, and the terminal device performs SRS antenna switch according to the SRS antenna switch configuration information configured by the network device. In this way, network device and terminal device obtain the SRS antenna switch configuration, thereby providing a basis for the network device to perform reasonable downlink scheduling.

Optionally, on the basis of the embodiments shown in FIG. 3C, a following step may be further included after S103'.

In S104, the network device performs downlink scheduling according to the SRS antenna switch configuration information.

In some embodiments, the network device can reasonably schedule the terminal device according to the SRS antenna switch configuration information corresponding to the terminal device to avoid conflict of transmission resources, thereby improving the transmission performance of the terminal device and improving the efficiency of the communication system.

The following is a detailed description according to the specific implementation of the SRS antenna switch configuration information obtained by the network device, which includes the insertion loss fallback value of the target frequency band corresponding to the SRS antenna switch performed by the terminal device, the switch delay configuration information and the interruption configuration information, respectively.

Figure 4:
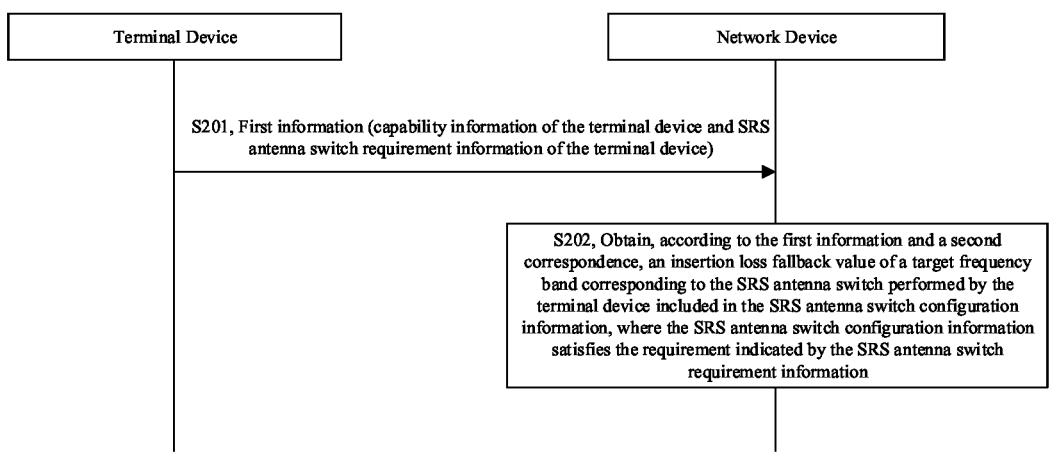
FIG. 4 is a flowchart of a communication method according to some other embodiments of this application.

FIG. 4 is a flowchart of a communication method according to some other embodiments of this application. In these embodiments, description is given in detail where the SRS antenna switch configuration information obtained by the network device includes the insertion loss fallback value of the target frequency band corresponding to the SRS antenna switch performed by the terminal device (abbreviated as the insertion loss fallback value). As shown in FIG. 4, the method according to some embodiments includes following steps.

In S201, the terminal device sends first information to the network device, where the first information includes capability information of the terminal device and SRS antenna switch requirement information of the terminal device.

Step S201 in some embodiments is similar to step S101 in the embodiments shown in FIG. 3A, and reference may be made to the detailed description in the embodiments shown in FIG. 3A, which is not repeated here.

In S202, the network device obtains, according to the first information and a second correspondence, the insertion loss fallback value of the target frequency band corresponding to the SRS antenna switch performed by the terminal device, which is included in the SRS antenna switch configuration information.

In some embodiments, when the SRS antenna switch configuration information includes the insertion loss fallback value of the target frequency band corresponding to the SRS antenna switch performed by the terminal device, the first correspondence described in the embodiments shown in FIG. 3 includes the second correspondence in the embodiments described herein. Herein, the second correspondence is a correspondence among multiple SRS antenna switch modes, frequency bands corresponding to the SRS antenna switch performed by the terminal device, and insertion loss fallback values of the frequency bands.

In a possible embodiment, in the second correspondence, under the same SRS antenna switch mode, the insertion loss fallback values corresponding to different frequency bands are not exactly the same. In some examples, the insertion loss fallback values corresponding at least two frequency bands in the same SRS antenna switch mode may be the same. In some examples, the configurable insertion loss fallback values in different frequency bands may be consistent with the insertion loss fallback corresponding to the radio frequency indicators of the terminal device in RAN4 protocol.

Optionally, in the second correspondence, under the same SRS antenna switch mode, the insertion loss fallback values corresponding to different frequency bands are elements in the same sequence. Exemplarily, in the same SRS antenna switch mode, the insertion loss fallback values of N frequency bands correspond to the elements in the sequence $\{a1, a2, \ldots, aN\}$, respectively, where N is a positive integer. In other words, different frequency bands correspond to different insertion loss fallback values in the same SRS antenna switch mode.

Optionally, all SRS antenna switch modes correspond to a set of insertion loss fallback value sequences, which are applicable to all frequency bands. In particular, different frequency bands in the same SRS antenna switch mode may correspond to the same insertion loss backoff value.

It should be noted that the second correspondence may be preset, or may be defined in a protocol, or may also be configured by the network side, which is not limited in the embodiments of this application.

It should be understood that, according to some embodiments, the insertion loss fallback value of the target frequency band corresponding to the SRS antenna switch performed by the terminal device included in the SRS antenna switch configuration information meets the requirement on insertion loss fallback value indicated in the SRS antenna switch requirement information of the terminal device. In some embodiments, the terminal device reports the first information, and the network device accurately obtains, based on the first information and the second correspondence reported by the terminal device, the insertion loss fallback value of the target frequency band corresponding to SRS antenna switch performed by the terminal device included in the SRS antenna switch configuration information. In this way, the network device can obtain the accurate insertion loss fallback value of the target frequency band corresponding to the SRS antenna switch, which is beneficial to the accurate calculation of the receiver sensitivity of the terminal device.

Figure 5:
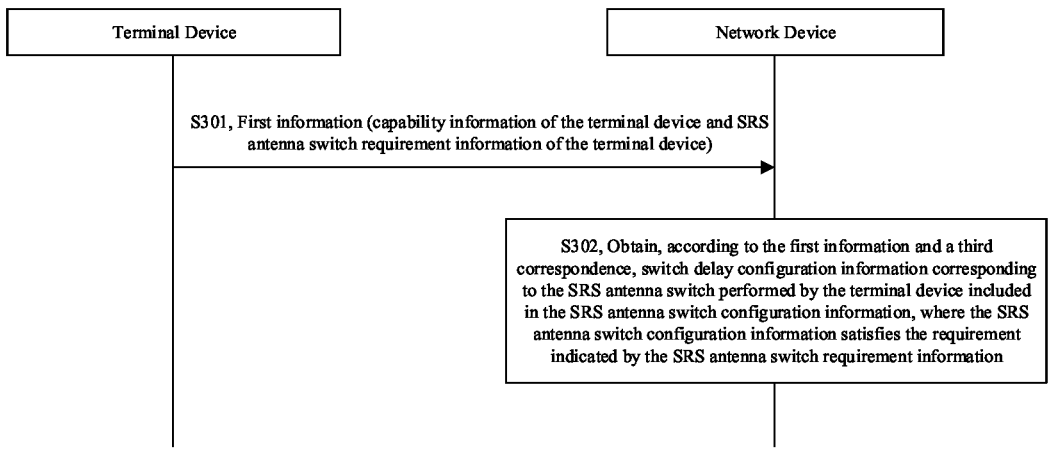
FIG. 5 is a flowchart of a communication method according to some other embodiments of this application.

FIG. 5 is a flowchart of a communication method according to some other embodiments of this application. In these embodiments, description is given in detail where the SRS antenna switch configuration information obtained by the network device includes the switch delay configuration information. As shown in FIG. 5, the method according to some embodiments includes following steps.

In S301, the terminal device sends first information to the network device, where the first information includes capability information of the terminal device and SRS antenna switch requirement information of the terminal device.

Step S301 in some embodiments is similar to step S101 in the embodiments shown in FIG. 3A, and reference may be made to the detailed description in the embodiments shown in FIG. 3A, which is not repeated here.

In S302, the network device acquires, according to the first information and a third correspondence, the switch delay configuration information corresponding to SRS antenna switch performed by the terminal device, which is included in the SRS antenna switch configuration information.

In some embodiments, when the SRS antenna switch configuration information includes the switch delay configuration information corresponding to the SRS antenna switch performed by the terminal device, the first correspondence described in the embodiments shown in FIG. 3 includes the third correspondence in the embodiments described herein, and the third correspondence is a correspondence among the capability information of various terminal devices, various SRS antenna switch modes, and the switch delay configuration information.

The switch delay configuration information may include whether the terminal device supports switch delay, that is, the capabilities of different terminal devices correspond to support or not-support of switch delay when the SRS antenna switch is supported.

Optionally, the switch delay configuration information further includes corresponding switch delay types when the terminal device supports different switch delays, where each switch delay type corresponds to one or more switch delays.

In some embodiments, the switch delay configuration information may also include: whether the terminal device supports switch delay, and the switch delay types corresponding to different switch delays supported by the terminal device.

In other words, according to the first information reported by the terminal device and the third correspondence described in the embodiments, it can be determined whether the terminal device supports the switch delay, and/or, the requirement on the switch delay type when the terminal device supports the switch delay. In some embodiments, different switch types correspond to one or more switch delays. Therefore, the requirement on the switch delay type is the requirement of the switch delay corresponding to the terminal device.

In a possible embodiment, the third correspondence is a correspondence between the capability information of various terminal devices, various SRS antenna switch modes, and whether the terminal device supports switch delay. In this way, it can be determined whether the terminal device supports switch delay according to the first information reported by the terminal device and the third correspondence.

Optionally, if it is determined that the terminal device supports the switch delay, the network device may determine the switch delay corresponding to the SRS antenna switch performed by the terminal device according to a preset switch delay.

In another possible embodiment, all terminal devices support switch delay, multiple switch delay types may be defined, and each switch delay type corresponds to one or more switch delays. Accordingly, the third correspondence may be a correspondence between the capability information of various terminal devices, various SRS antenna switch modes, and switch delay types, then the network device may determine the switch delay type corresponding to the SRS antenna switch performed by the terminal device according to the first information reported by the terminal device and the third correspondence, and further determine the switch delay according to the switch delay type corresponding to the SRS antenna switch performed by the terminal device.

Exemplarily, the switch delay types may include switch delay type 1 (type1) and switch delay type 2 (type2), where the switch delay type 1 may correspond to 7 SRS antenna switch modes in the current version of Rel-15 protocol, and the switch delay type 2 corresponds to the 6 SRS antenna switch modes newly added in the current version of Rel-16 protocol.

The switch delay type 1 may correspond to a switch delay, which may be pre-configured by the protocol.

The switch delay type 2 may correspond to multiple switch delays or multiple groups of switch delays. For example, when a bandwidth part (BWP) switch is supported by multiple carriers, the switch delay may vary according to the capabilities of the terminal device.

In some embodiments, if the switch delay type corresponds to multiple groups of switch delays, and each group of switch delays includes multiple switch delays, the multiple switch delays included in each group of switch delays may correspond to different interruptions. For example, a group of switch delays is expressed as {0, 35, 140, 210}, then the four switch delays included in this group may respectively correspond to four groups of interruptions of SRS antenna switch.

Exemplarily, the switch delay types may also include more than two switch delay types. In the third correspondence, each switch delay type corresponds to one or more SRS antenna switch modes. In other words, the switch delays of all configurable SRS antenna switch modes may be grouped, with each group corresponding to a different switch delay type. The correspondence may be implemented by means of network signaling configuration or protocol pre-configuration.

Exemplarily, in the third correspondence, the SRS antenna switch mode may also correspond to the switch delay, that is, one SRS antenna switch mode corresponds to one switch delay. In practical applications, the switch delays corresponding to different SRS antenna switch modes may be the same or different, which is not limited in the embodiments of this application. The configurable switch delays of each SRS antenna switch mode may be consistent with the BWP switch delay of the terminal device in the RAN4 protocol.

It should be noted that the third correspondence may be preset, or may be defined in a protocol, or may also be configured by the network side, which is not limited in the embodiments of this application.

It should be understood that, according to some embodiments, the obtained SRS antenna switch configuration information includes the switch delay configuration information corresponding to SRS antenna switch performed by the terminal device, which meets the switch delay requirement indicated in the SRS antenna switch requirement information of the terminal device.

In some embodiments, the terminal device reports the first information, and the network device accurately obtains, based on the first information reported by the terminal device and the third correspondence, the switch delay configuration information included in the SRS antenna switch configuration information corresponding to the SRS antenna switch performed by the terminal device. In this way, the network device can obtain the accurate switch start time and time length corresponding to the SRS antenna switch, which is beneficial to minimize the impact on the transmission performance and link adaptation of the terminal device, thereby improving the efficiency of the communication system.

Figure 6:
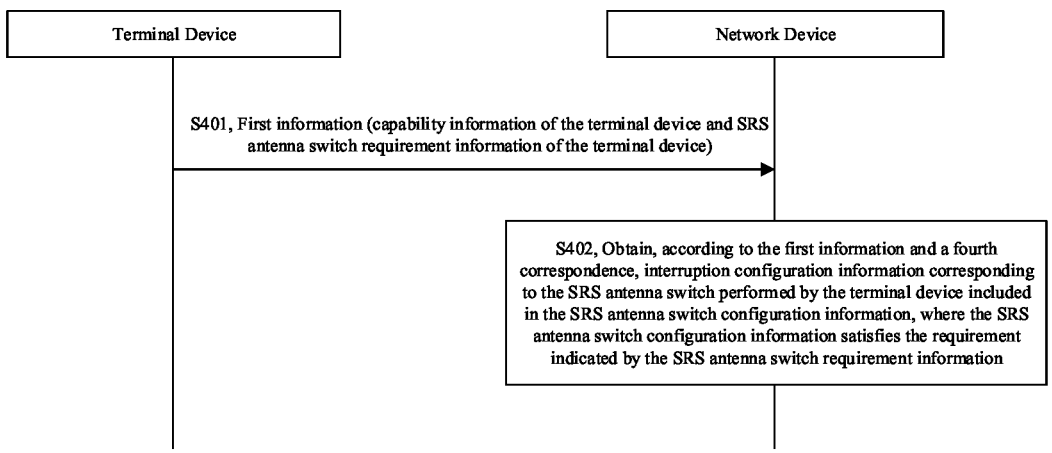
FIG. 6 is a flowchart of a communication method according to some other embodiments of this application.

FIG. 6 is a flowchart of a communication method according to some other embodiments of this application. In these embodiments, description is given in detail where the SRS antenna switch configuration information acquired by the network device includes the interruption configuration information. As shown in FIG. 6, the method according to some embodiments includes following steps.

In S401, the terminal device sends first information to the network device, where the first information includes capability information of the terminal device and SRS antenna switch requirement information of the terminal device.

Step S401 in some embodiments is similar to step S101 in the embodiments shown in FIG. 3A, and reference may be made to the detailed description in the embodiments shown in FIG. 3A, which is not repeated here.

In S402, the network device acquires, according to the first information and a fourth correspondence, the interruption configuration information corresponding to SRS antenna switch performed by the terminal device, which is included in the SRS antenna switch configuration information.

In some embodiments, when the SRS antenna switch configuration information includes the interruption configuration information corresponding to the SRS antenna switch performed by the terminal device, the first correspondence described in the embodiments shown in FIG. 3 includes the four correspondences in the embodiments described herein, where the four correspondences is a correspondence among the capability information of various terminal devices, the various SRS antenna switch modes, and the interrupt configuration information.

The interruption configuration information may include: whether the terminal device supports interruption of SRS antenna switch, and/or a corresponding interruption time when the terminal device supports the interruption of SRS antenna switch.

In other words, according to the first information reported by the terminal device and the fourth correspondence described here in some embodiments, it can be determined whether the terminal device supports the interruption of SRS antenna switch, and/or the corresponding interruption time when the terminal device supports the interruption of SRS antenna switch.

In a possible embodiment, in the fourth correspondence, for all SRS antenna switch modes, the interruption times corresponding to the interruption of SRS antenna switch supported by all terminal devices are the same. Then, regardless of whether the capabilities of the terminal devices are different, the interruption times corresponding to the interruption of SRS antenna switch performed by the terminal devices are the same.

In another possible embodiment, in the fourth correspondence, for the same SRS antenna switch mode, the same interruption time set corresponds to the interruption of SRS antenna switch supported by terminal devices of different switch delay types, where the interruption time set includes at least one interruption time. That is to say, in the fourth correspondence, for the same SRS antenna switch mode, terminal devices of different switch delay types correspond to the same one interruption time or the same group of interruption times.

The switch delay type may refer to the description in the embodiments shown in FIG. 5, or may be determined according to the third correspondence in the embodiments shown in FIG. 5.

Optionally, if the interruption time set includes multiple interruption times, there may be no correlation between the interruption time and the SRS antenna switch mode. In other words, when the interruption of SRS antenna switch is supported by the terminal device, under each SRS antenna switch mode, any interruption time in the interruption time set may be configured.

Optionally, if the interruption time set includes multiple interruption times, association relationship may be present between the interruption time and the SRS antenna switch mode. In other words, the interruption times corresponding to all SRS antenna switch modes configurable by the terminal device are grouped, with respective groups corresponding to different interruption times. This association relationship may be implemented by means of network signaling configuration or protocol pre-configuration.

For example, the SRS antenna switch modes are expressed as a set {A1, A2, . . . , An, B1, B2, . . . , Bn, C1, C2, . . . , Cn}; the switch delay types include switch delay type A, switch delay type B, and switch delay type C; and a set of interruption times is {iA1, iA2, . . . , iAn, iB1, iB2, . . . , iBn, iC1, iC2, . . . , iCn}. Herein, the terminal device that supports the SRS antenna switch mode {A1, A2, . . . , An} corresponds to the switch delay type A, and the corresponding interruption time is {iA1, iA2, . . . , iAn}; the terminal device that supports the SRS antenna switch mode {B1, B2, . . . , Bn} corresponds to the switch delay type B, and the corresponding interruption time is {iB1, iB2, . . . , iBn}; and the terminal device that supports SRS antenna switch mode {C1, C2, . . . , Cn} corresponds to the switch delay type C, and the corresponding interruption time is {iC1, iC2, . . . , iCn}; where n may be a positive integer.

In another possible embodiment, in the fourth correspondence, there is a one-to-one correspondence between the switch delay supported by the SRS antenna switch mode and the interruption time. For example, SRS antenna switch mode 1 supports switch delay 1, and the switch delay 1 corresponds to interruption time 1; SRS antenna switch mode 2 supports switch delay 2, and the switch delay 2 corresponds to interruption time 2; SRS antenna switch mode 3 supports switch delay 3, and the switch delay 3 corresponds to interruption time 3; and so on.

Optionally, the interruption times corresponding to the switch delays supported by different SRS antenna switch modes may be the same or different, which is not limited in the embodiments of this application. For example, the interruption time 1 corresponding to the switch delay 1 supported by the SRS antenna switch mode 1 and the interruption time 2 corresponding to the switch delay 2 supported by the SRS antenna switch mode 2 may be the same or different.

Optionally, the correspondence between the switch delay supported by the SRS switch mode and the interruption time may be configured by network signaling or pre-configured in a protocol.

Optionally, the interruption times corresponding to the switch delays supported by the SRS antenna switch modes may be consistent with the interruption times corresponding to the BWP switch in the RAN4 protocol.

It should be noted that the fourth correspondence may be preset, or may also be defined in a protocol, or may also be configured by the network side, which is not limited in the embodiments of this application.

It should be understood that, according to some embodiments, the interruption configuration information corresponding to SRS antenna switch performed by the terminal device included in the obtained SRS antenna switch configuration information meets the interruption requirement indicated in the SRS antenna switch requirement information of the terminal device.

In some embodiments, the terminal device reports the first information, and the network device accurately obtains, based on the first information reported by the terminal device and the fourth correspondence, the interruption configuration information corresponding to the SRS antenna switch performed by the terminal device, which is included in the SRS antenna switch configuration information. In this way, the network device can obtain the accurate interruption start time and time length of the SRS antenna switch, which is beneficial to minimize the impact on the transmission performance and link adaptation of the terminal device, thereby improving the efficiency of the communication system.

It should be noted that, in practical applications, the above embodiments may be implemented alone or in combination. For example, when the SRS antenna switch configuration information includes two or more of the insertion loss fallback value of the target frequency band corresponding to the SRS antenna switch of the terminal device, the switch delay configuration information and interruption configuration information corresponding to the SRS antenna switch performed by the terminal device, the embodiments shown in FIG. 4 to FIG. 6 may be implemented in combination.

It should be noted that, in practical applications, the terminal device may also determine the SRS antenna switch configuration information corresponding to the SRS antenna switch performed by the terminal device according to the capability information thereof, the SRS antenna switch mode indicated by the network device, and the first correspondence, where the SRS antenna switch configuration information includes at least one of the following information: the insertion loss fallback value of the target frequency band corresponding to the SRS antenna switch of the terminal device, the switch delay configuration information and the interruption configuration information corresponding to the SRS antenna switch performed by the terminal device.

The specific implementation method of the terminal device to obtain the SRS antenna switch configuration information according to the capability information thereof, the SRS antenna switch mode indicated by the network device, and the first correspondence, is similar to the method of the network device, except that the execution body is different, so the reference may be made to the detailed description of the network device acquiring the SRS antenna switch configuration information corresponding to the terminal device, which will not be repeated here.

Figure 7:
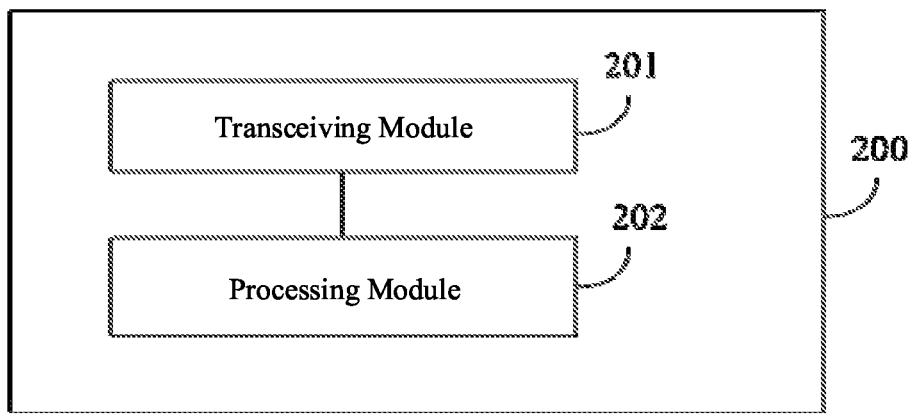
FIG. 7 is a block diagram of a communication device according to some embodiments of this application.

FIG. 7 is a block diagram of a network device according to some embodiments of this application. As shown in FIG. 7, the communication device 200 provided in some embodiments includes a transceiving module 201.

The transceiving module 201 is configured to receive first information sent by a terminal device, where the first information includes capability information of the terminal device and SRS antenna switch requirement information of the terminal device.

Herein, the capability information of the terminal device is used for indicating antenna switch capability supported by the terminal device; and the SRS antenna switch requirement information is used for indicating requirement for the terminal device to perform SRS antenna switch.

In some embodiments, the SRS antenna switch requirement information includes at least one of following information: an insertion loss fallback value of a target frequency band corresponding to the SRS antenna switch performed by the terminal device, switch delay requirement and interruption requirement corresponding to the SRS antenna switch performed by the terminal device.

In some embodiments, the communication device 200 further includes a processing module 202.

Herein, the processing module 202 is configured to obtain SRS antenna switch configuration information of the terminal device according to the first information and a first correspondence, where the first correspondence is a correspondence between the SRS antenna switch configuration information and capability information of various terminal devices.

In some embodiments, if the SRS antenna switch configuration information includes an insertion loss fallback value of a target frequency band corresponding to the SRS antenna switch performed by the terminal device, the first correspondence includes a second correspondence, where the second correspondence is a correspondence between multiple SRS antenna switch modes, a frequency band corresponding to the SRS antenna switch performed by the terminal device, and an insertion loss fallback value of the frequency band.

In some embodiments, in the second correspondence, under a same SRS antenna switch mode, insertion loss fallback values corresponding to different frequency bands are not exactly the same.

In some embodiments, in the second correspondence, under the same SRS antenna switch mode, the insertion loss fallback values corresponding to different frequency bands are elements in a same sequence.

In some embodiments, the capability information of the terminal device further includes information used for indicating a switch delay type supported by the terminal device.

In some embodiments, if the SRS antenna switch configuration information includes switch delay configuration information corresponding to the SRS antenna switch performed by the terminal device, the first correspondence includes a third correspondence, where the third correspondence is a correspondence between capability information of various terminal devices, an SRS antenna switch mode, and the switch delay configuration information.

In some embodiments, the switch delay configuration information includes whether the terminal device supports a switch delay.

In some embodiments, the switch delay configuration information includes switch delay types corresponding to different switch delays supported by the terminal device, where each of the switch delay types corresponds to one or more switch delays.

In some embodiments, if the SRS antenna switch configuration information includes interruption configuration information corresponding to the SRS antenna switch performed by the terminal device, the first correspondence includes a fourth correspondence, where the fourth correspondence is a correspondence between capability information of various terminal devices, various SRS antenna switch modes, and the interruption configuration information.

In some embodiments, the interruption configuration information includes whether the terminal device supports interruption of the SRS antenna switch.

In some embodiments, the interruption configuration information includes a corresponding interruption time when the terminal device supports the interruption.

In some embodiments, in the fourth correspondence, under all of the SRS antenna switch modes, corresponding interruption times when the terminal device supports the interruption are the same.

In some embodiments, in the fourth correspondence, under a same SRS antenna switch mode, a corresponding interruption time set when terminal devices of different switch delay types support the interruption is the same, and the interruption time set includes at least one interruption time.

In some embodiments, in the fourth correspondence, switch delays supported by the SRS antenna switch modes are in one-to-one correspondence with interruption times.

In some embodiments, the interruption times corresponding to different switch delays are not exactly the same.

In some embodiments, the processing module 202 is further configured to determine an SRS antenna switch mode of the terminal device according to the SRS antenna switch requirement information.

Accordingly, the transceiving module 201 is further configured to send information indicating the SRS antenna switch mode to the terminal device.

In some embodiments, the processing module 202 is further configured to determine the SRS antenna switch configuration information according to the determined SRS antenna switch mode.

Accordingly, the transceiving module 201 is further configured to send information indicating the SRS antenna switch configuration information to the terminal device.

In some embodiments, the processing module 202 is further configured to perform downlink scheduling according to the SRS antenna switch configuration information of the terminal device.

The communication device according to some embodiments can be configured to implement the technical solutions performed by the network device in the above method embodiments, and the implementation principles and technical effects thereof are similar. So reference can be made to the detailed description of the above method embodiments, which will not be repeated here.

Figure 8:
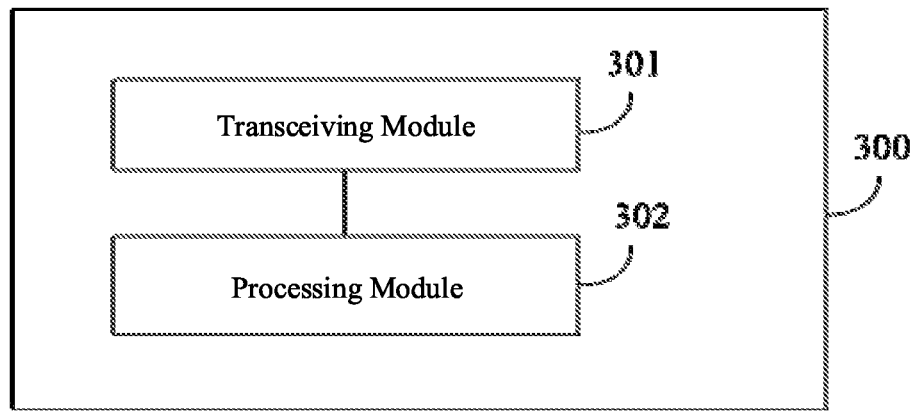
FIG. 8 is a block diagram of a communication device according to some other embodiments of this application.

FIG. 8 is a block diagram of a communication device according to some other embodiments of this application. As shown in FIG. 8, the communication device 300 provided in some embodiments includes a transceiver module 301 configured to send first information to a network device, where the first information includes capability information of the terminal device and SRS antenna switch requirement information of the terminal device.

Herein, the capability information of the terminal device is used for indicating antenna switch capability supported by the terminal device; and the SRS antenna switch requirement information is used for indicating requirement for the terminal device to perform SRS antenna switch.

In some embodiments, the SRS antenna switch requirement information includes at least one of following information: an insertion loss fallback value of a target frequency band corresponding to the SRS antenna switch of the terminal device, switch delay requirement and interruption requirement corresponding to the SRS antenna switch performed by the terminal device.

In some embodiments, the communication device 300 further includes a processing module 302.

The processing module 302 is configured to obtain SRS antenna switch configuration information of the terminal device, where the SRS antenna switch configuration information meets the requirement indicated by the SRS antenna switch requirement information.

In some embodiments, the transceiving module 301 is further configured to receive information indicating an SRS antenna switch mode sent by the network device.

In some embodiments, the processing module 302 is specifically configured to obtain the SRS antenna switch configuration information of the terminal device according to the capability information of the terminal device, an SRS antenna switch mode indicated by the network device, and a first correspondence.

Herein, the first correspondence is a correspondence between the SRS antenna switch configuration information and capability information of various terminal devices.

In some embodiments, if the SRS antenna switch configuration information includes an insertion loss fallback value of a target frequency band corresponding to the SRS antenna switch performed by the terminal device, the first correspondence includes a second correspondence, where the second correspondence is a correspondence between multiple SRS antenna switch modes, a frequency band corresponding to the SRS antenna switch performed by the terminal device, and an insertion loss fallback value of the frequency band.

In some embodiments, in the second correspondence, under a same SRS antenna switch mode, insertion loss fallback values corresponding to different frequency bands are not exactly the same.

In some embodiments, in the second correspondence, under the same SRS antenna switch mode, the insertion loss fallback values corresponding to different frequency bands are elements in a same sequence.

In some embodiments, the capability information of the terminal device further includes information used for indicating a switch delay type supported by the terminal device.

In some embodiments, if the SRS antenna switch configuration information includes switch delay configuration information corresponding to the SRS antenna switch performed by the terminal device, the first correspondence includes a third correspondence, where the third correspondence is a correspondence between capability information of various terminal devices, multiple SRS antenna switch modes, and the switch delay configuration information.

In some embodiments, the switch delay configuration information includes whether the terminal device supports a switch delay.

In some embodiments, the switch delay configuration information includes switch delay types corresponding to different switch delays supported by the terminal device, where each of the switch delay types corresponds to one or more switch delays.

In some embodiments, if the SRS antenna switch configuration information includes interruption configuration information corresponding to the SRS antenna switch performed by the terminal device, the first correspondence includes a fourth correspondence, where the fourth correspondence is a correspondence between capability information of various terminal devices, the SRS antenna switch modes, and the interruption configuration information.

In some embodiments, the interruption configuration information includes whether the terminal device supports interruption of the SRS antenna switch.

In some embodiments, the interruption configuration information includes a corresponding interruption time when the terminal device supports the interruption.

In some embodiments, in the fourth correspondence, under all of the SRS antenna switch modes, corresponding interruption times when the terminal device supports the interruption are the same.

In some embodiments, in the fourth correspondence, under a same SRS antenna switch mode, a corresponding interruption time set when terminal devices of different switch delay types support the interruption is the same, and the interruption time set includes at least one interruption time.

In some embodiments, in the fourth correspondence, switch delays supported by the SRS antenna switch modes are in one-to-one correspondence with interruption times.

In some embodiments, the interruption times corresponding to different switch delays are not exactly the same.

In some embodiments, the transceiving module 301 is further configured to receive the SRS antenna switch configuration information sent by the network device.

Herein, the processing module 302 obtains, according to the capability information of the terminal device and/or the SRS antenna switch mode supported by the terminal device and the first correspondence, the SRS antenna switch configuration information in a similar manner as the network device, while the difference only lies in the execution subject. So reference can be made to the detailed description of acquiring the SRS antenna switch requirement information corresponding to the terminal device by the network device, which will not be repeated here.

The communication device according to some embodiments can be configured to implement the technical solutions performed by the terminal device in the above method embodiments, and the implementation principles and technical effects thereof are similar, which will not be repeated here.

Figure 9:
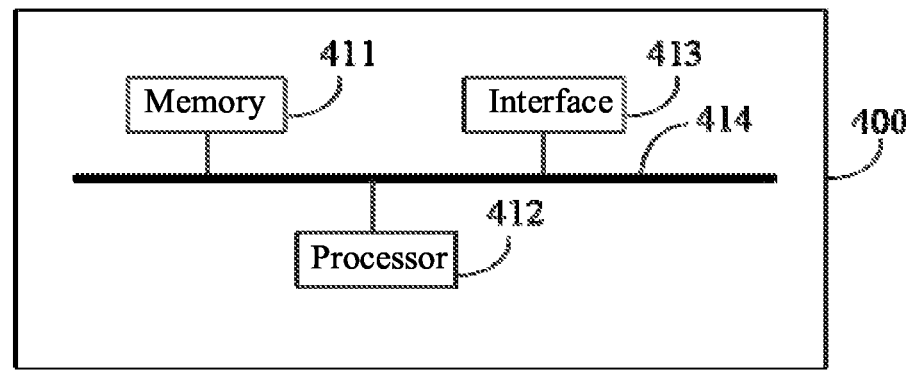
FIG. 9 is a block diagram of a communication device according to some other embodiments of this application.

FIG. 9 is a block diagram of a communication device according to some other embodiments of this application. As shown in FIG. 9, the communication device 400 provided in some embodiments includes: a memory 411, a processor 412, and an interface 413 for communicating with the terminal device.

The memory 411 stores computer-executed instructions.

The processor 412 executes the computer-executed instructions stored in the memory 411, causing the processor 412 to implement the technical solution of the network device in any of the foregoing method embodiments. In some embodiments, the memory and the processor may be connected through a system bus 414.

FIG. 9 may be a simple design of the network device. Embodiments of this application do not limit the number of processors and memories in the network device. FIG. 9 only uses one (processor and memory) as an example for description.

Figure 10:
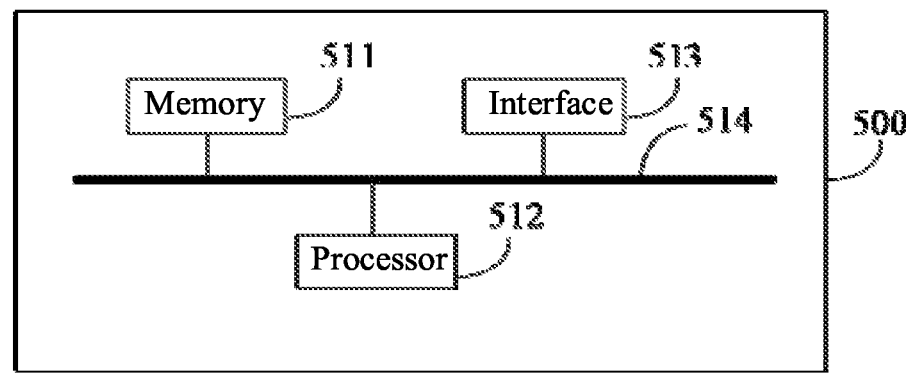
FIG. 10 is a block diagram of a communication device according to some other embodiments of this application.

FIG. 10 is a block diagram of a communication device according to some other embodiments of this application. As shown in FIG. 10, the communication device 500 provided in some embodiments includes: a memory 511, a processor 512, and an interface 513 for communicating with terminal device.

The memory 511 stores computer-executed instructions;

The processor 512 executes the computer-executed instructions stored in the memory 511, causing the processor 512 to implement the technical solution of the terminal device in any of the foregoing method embodiments. In some embodiments, the memory and the processor may be connected through a system bus 514.

FIG. 10 may be a simple design of the terminal device. Embodiments of this application do not limit the number of processors and memories in the network device. FIG. 10 only uses one (processor and memory) as an example for description.

In an exemplary implementation of the network device shown in FIG. 9 and the terminal device shown in FIG. 10, the memory, the processor, and the interface may be connected through a bus. Optionally, the memory may be integrated inside the processor.

Embodiments of this application further provide a computer-readable storage medium, where computer-executable instructions are stored in the computer-readable storage medium, and the computer-executable instructions, when being executed by a processor, are used for implementing the technical solution of the network device according to any of the foregoing method embodiments.

Embodiments of this application further provide a computer-readable storage medium, where computer-executable instructions are stored in the computer-readable storage medium, and the computer-executable instructions, when being executed by a processor, are used for implementing the technical solution of the terminal device according to any of the foregoing method embodiments.

Embodiments of this application further provide a program, which, when the being executed by a processor, is used for performing the technical solution of the network device according to any of the foregoing method embodiments. Optionally, the above-mentioned processor may be a chip.

Embodiments of this application further provide a program, which, when the being executed by a processor, is used for performing the technical solution of the terminal device according to any of the foregoing method embodiments. Optionally, the above-mentioned processor may be a chip.

Embodiments of this application further provide a computer program product, including program instructions, where the program instructions are used for implementing the technical solution of the network device according to any of the foregoing method embodiments.

Embodiments of this application further provide a computer program product, including program instructions, where the program instructions are used for implementing the technical solution of the terminal device according to any of the foregoing method embodiments.

Embodiments of this application further provide a chip, including: a processing module and a communication interface, where the processing module is configured to perform the technical solution at the network device side according to any of the foregoing method embodiments.

Further, the chip also includes a storage module (e.g., a memory), where the storage module is used for storing instructions, the processing module is used for executing the instructions stored in the storage module, and the execution of the instructions stored in the storage module causes the processing module to perform the technical solution of the network device according to any of the foregoing method embodiments.

Embodiments of this application further provide a chip, including: a processing module and a communication interface, where the processing module is configured to perform the technical solution at the terminal device side according to any of the foregoing method embodiments.

Further, the chip also includes a storage module (e.g., a memory), where the storage module is used for storing instructions, the processing module is used for executing the instructions stored in the storage module, and the execution of the instructions stored in the storage module causes the processing module to perform the technical solution of the terminal device according to any of the foregoing method embodiments.

In the several embodiments provided in this application, it should be understood that the disclosed apparatus and method may be implemented in other manners. For example, the device embodiments described above are only illustrative. For example, the division of the modules is only a logical function division. In actual implementation, there may be other division manners. For example, multiple modules may be combined or integrated to another system, or some features may be ignored or not implemented. On the other hand, the mutual coupling or direct coupling or communication connection shown or discussed may be through some interfaces, and the indirect coupling or communication connection of modules may be in electrical, mechanical or other forms.

In the exemplary implementation of the above-mentioned terminal device and network device, it should be understood that the processor may be a central processing unit (abbreviated as CPU), or other general-purpose processors, digital signal processors (abbreviated as DSPs), application specific integrated circuit (abbreviated as ASIC) and so on. A general purpose processor may be a microprocessor or the processor may be any conventional processor or the like. The steps in combination with the method disclosed in this application may be directly embodied as being executed by a hardware processor, or executed by a combination of hardware and software modules in the processor.

All or part of the steps for implementing the above method embodiments may be completed by program instructions related to hardware. The aforementioned program may be stored in a readable memory. When the program is executed, the steps including the above method embodiments are executed; and the aforementioned memory (storage medium) includes: read-only memory (abbreviated as ROM), RAM, flash memory, hard disk, solid state drive, magnetic tape, floppy disk, optical disc and any combination thereof.

What is claimed is:

1. A communication method, comprising:
receiving, by a network device, first information sent by a terminal device, wherein the first information comprises capability information of the terminal device and uplink sounding reference signal (SRS) antenna switch requirement information of the terminal device;
wherein the capability information of the terminal device is used for indicating antenna switch capability supported by the terminal device; and the SRS antenna switch requirement information is used for indicating requirement for the terminal device to perform SRS antenna switch,
wherein the method further comprises:
obtaining, by the network device, SRS antenna switch configuration information of the terminal device according to the first information and a first correspondence, wherein the SRS antenna switch configuration information meets the requirement indicated by the SRS antenna switch requirement information; and
wherein the first correspondence is a correspondence between the SRS antenna switch configuration information and capability information of various terminal devices.

2. The method as claimed in claim 1, wherein the SRS antenna switch requirement information comprises at least one of following information: an insertion loss fallback value of a target frequency band corresponding to the SRS antenna switch of the terminal device, switch delay requirement and interruption requirement corresponding to the SRS antenna switch performed by the terminal device.

3. The method as claimed in claim 1, wherein, if the SRS antenna switch configuration information comprises switch delay configuration information corresponding to the SRS antenna switch performed by the terminal device,
the first correspondence comprises a third correspondence, wherein the third correspondence is a correspondence between capability information of various terminal devices, an SRS antenna switch mode, and a switch delay.

4. The method as claimed in claim 1, wherein, if the SRS antenna switch configuration information comprises an interruption configuration corresponding to the SRS antenna switch performed by the terminal device,
the first correspondence comprises a fourth correspondence, wherein the fourth correspondence is a correspondence between capability information of various terminal devices, various SRS antenna switch modes, and interruption configurations.

5. The method as claimed in claim 1, further comprising:
determining, by the network device, an SRS antenna switch mode of the terminal device according to the SRS antenna switch requirement information; and
sending, by the network device, information indicating the SRS antenna switch mode to the terminal device.

6. The method as claimed in claim 5, further comprising:
determining, by the network device, the SRS antenna switch configuration information according to the determined SRS antenna switch mode; and
sending, by the network device, information indicating the SRS antenna switch configuration information to the terminal device.

7. The method as claimed in claim 1, further comprising:
performing, by network device, downlink scheduling according to the SRS antenna switch configuration information of the terminal device.

8. A communication method, comprising:
sending, by a terminal device, first information to a network device, wherein the first information comprises capability information of the terminal device and uplink sounding reference signal (SRS) antenna switch requirement information of the terminal device;
wherein the capability information of the terminal device is used for indicating antenna switch capability supported by the terminal device; and the SRS antenna switch requirement information is used for indicating requirement for the terminal device to perform SRS antenna switch, and obtaining, by the terminal device, SRS antenna switch configuration information of the terminal device, wherein the SRS antenna switch configuration information meets the requirement indicated by the SRS antenna switch requirement information, wherein obtaining, by the terminal device, the SRS antenna switch configuration information of the terminal device comprises:

obtaining, by the terminal device, the SRS antenna switch configuration information of the terminal device according to the capability information of the terminal device, an SRS antenna switch mode indicated by the network device, and a first correspondence, wherein the first correspondence is a correspondence between the SRS antenna switch configuration information and capability information of various terminal devices.

9. The method as claimed in claim 8, wherein the SRS antenna switch requirement information comprises at least one of following information: an insertion loss fallback value of a target frequency band corresponding to the SRS antenna switch of the terminal device, switch delay requirement and interruption requirement corresponding to the SRS antenna switch performed by the terminal device.

10. The method as claimed in claim 8, further comprising:
receiving, by the terminal device, information indicating an SRS antenna switch mode sent by the network device.

11. The method as claimed in claim 8, wherein, if the SRS antenna switch configuration information comprises an insertion loss fallback value of a target frequency band corresponding to the SRS antenna switch performed by the terminal device, the first correspondence comprises a second correspondence, wherein the second correspondence is a correspondence between multiple SRS antenna switch modes, a frequency band corresponding to the SRS antenna switch performed by the terminal device, and an insertion loss fallback value of the frequency band.

12. The method as claimed in claim 11, wherein, if the SRS antenna switch configuration information comprises switch delay configuration information corresponding to the SRS antenna switch performed by the terminal device,
the first correspondence comprises a third correspondence, wherein the third correspondence is a correspondence between capability information of various terminal devices, multiple SRS antenna switch modes, and the switch delay configuration information.

13. The method as claimed in claim 11, wherein, if the SRS antenna switch configuration information comprises interruption configuration information corresponding to the SRS antenna switch performed by the terminal device, the first correspondence comprises a fourth correspondence, wherein the fourth correspondence is a correspondence between capability information of various terminal devices, the SRS antenna switch modes, and the interruption configuration information.

14. The method as claimed in claim 8, wherein obtaining, by the terminal device, the SRS antenna switch configuration information of the terminal device comprises:
receiving, by the terminal device, the SRS antenna switch configuration information sent by the network device.

15. A network device, comprising:
a processor, a memory, and an interface for communication with a terminal device; wherein the memory stores computer-executable instructions; and
the processor executes the computer-executable instructions stored in the memory, causing the processor to:
receive, through the interface, first information sent by the terminal device, wherein the first information comprises capability information of the terminal device and uplink sounding reference signal (SRS) antenna switch requirement information of the terminal device;
wherein the capability information of the terminal device is used for indicating antenna switch capability supported by the terminal device; and the SRS antenna switch requirement information is used for indicating requirement for the terminal device to perform SRS antenna switch,
wherein the processor is further configured to:
obtain SRS antenna switch configuration information of the terminal device according to the first information and a first correspondence, wherein the SRS antenna switch configuration information meets the requirement indicated by the SRS antenna switch requirement information; and
wherein the first correspondence is a correspondence between the SRS antenna switch configuration information and capability information of various terminal devices.

16. The network device as claimed in claim 15, wherein the SRS antenna switch requirement information comprises at least one of following information: an insertion loss fallback value of a target frequency band corresponding to the SRS antenna switch of the terminal device, switch delay requirement and interruption requirement corresponding to the SRS antenna switch performed by the terminal device.

* * * * *